(12) United States Patent
Konno

(10) Patent No.: US 12,540,233 B2
(45) Date of Patent: Feb. 3, 2026

(54) SEALANT COMPOSITION AND PNEUMATIC TIRE USING SAME

(71) Applicant: Toyo Tire Corporation, Itami (JP)

(72) Inventor: Yuya Konno, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 534 days.

(21) Appl. No.: 18/071,787

(22) Filed: Nov. 30, 2022

(65) Prior Publication Data

US 2023/0192995 A1  Jun. 22, 2023

(30) Foreign Application Priority Data

Dec. 16, 2021  (JP) ................. 2021-204582

(51) Int. Cl.
C08L 9/00 (2006.01)
B29C 73/16 (2006.01)
C08L 7/00 (2006.01)

(52) U.S. Cl.
CPC .............. *C08L 9/00* (2013.01); *B29C 73/163* (2013.01); *C08L 7/00* (2013.01); *C08L 2205/035* (2013.01)

(58) Field of Classification Search
CPC .............. C08L 9/00; C08L 7/00; B29C 73/16
USPC ......................................... 524/35
See application file for complete search history.

(56) References Cited

U.S. PATENT DOCUMENTS

| 4,913,209 A | 4/1990 | Hong et al. |
| 6,264,732 B1 | 7/2001 | Tanaka et al. |
| 2011/0198010 A1 | 8/2011 | Voge et al. |
| 2011/0213050 A1* | 9/2011 | Pialot ........................ C08L 9/00 523/166 |
| 2014/0345771 A1 | 11/2014 | Giannini et al. |
| 2020/0040164 A1 | 2/2020 | Takahashi |
| 2020/0298510 A1* | 9/2020 | Randall ................... C08L 91/00 |

FOREIGN PATENT DOCUMENTS

| CN | 110546231 A | * 12/2019 | ............. B29C 73/02 |
| JP | H09-187869 A | 7/1997 | |
| JP | H10-71806 A | 3/1998 | |
| JP | 2011-529972 A | 12/2011 | |
| JP | 2017-128663 A | 7/2017 | |
| JP | 2019-189677 A | 10/2019 | |
| WO | WO-2010008943 A2 * | 1/2010 | ............... C09K 3/10 |
| WO | 2018/194104 A1 | 10/2018 | |

OTHER PUBLICATIONS

Office Action dated Aug. 19, 2025, issued in counterpart JP application No. 2021-204582, with English translation. (6 pages).

* cited by examiner

Primary Examiner — Deve V Hall
(74) Attorney, Agent, or Firm — WHDA, LLP

(57) ABSTRACT

Provided is a sealant composition excellent in exothermic performance, rigidity, and sealing characteristics, and a pneumatic tire using the sealant composition. The sealant composition contains 95 parts by mass to 150 parts by mass of a hydrocarbon resin, 20 parts by mass to 60 parts by mass of a liquid plasticizer, and 0.1 parts by mass to 10 parts by mass of a cellulose nanofiber, with respect to 100 parts by mass of a solid rubber component containing a diene rubber.

14 Claims, 1 Drawing Sheet

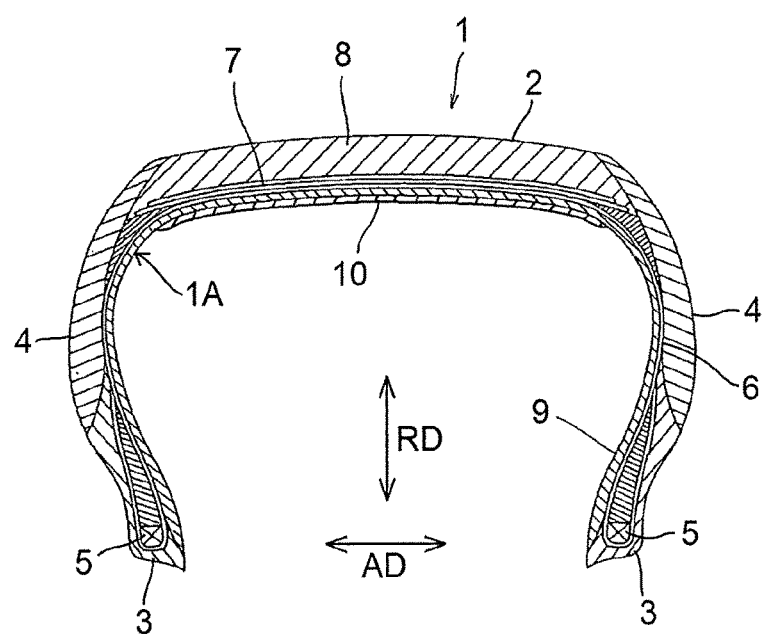

SEALANT COMPOSITION AND PNEUMATIC TIRE USING SAME

BACKGROUND OF THE INVENTION

1. Field of the Invention

The present invention relates to a sealant composition and a pneumatic tire using the sealant composition.

2. Description of the Related Art

When a pneumatic tire is punctured in an inner surface by a foreign matter such as a nail, a sealant composition, which is capable of blocking a hole and sealing a tire, is sometimes applied.

For example, JP-T-2011-529972 discloses a method of applying particles (11) to an inner wall of a tire, in which the particles (11) are applied to a self-sealing composition layer by a flocking method after the tire is cured, the tire includes two side walls (3), a crown (2) provided with a tread on a radially outer side, a carcass-type reinforcing structure (7), and at least one crown reinforcing material (6), each side wall (3) and an inner surface of the crown (2) form the inner wall, and at least a portion of the inner wall is covered by at least one layer (10) of a self-sealing composition.

SUMMARY OF THE INVENTION

However, in the invention disclosed in JP-T-2011-529972 the particles are applied to the self-sealing composition layer after the tire is cured to keep a tire structure completely intact, and there is room for improvement in sealing characteristics.

In addition, when the sealant composition is applied to a tire inner surface, in a case where a viscosity of the sealant composition is low, the sealant composition may not be fixed to a coated portion and may flow, making uniform coating impossible.

Further, when the sealant composition is applied to the tire inner surface, there is a concern that hysteresis loss increases during tire rolling and exothermic performance deteriorates.

In view of the above points, an object of the present invention is to provide a sealant composition excellent in exothermic performance, rigidity, and sealing characteristics.

In order to solve the problems, a sealant composition according to the invention contains 95 parts by mass to 150 parts by mass of a hydrocarbon resin, 20 parts by mass to 60 parts by mass of a liquid plasticizer, and 0.1 parts by mass to 10 parts by mass of a cellulose nanofiber, with respect to 100 parts by mass of a solid rubber component containing a diene rubber.

The hydrocarbon resin may be at least one selected from the group consisting of a petroleum-based resin, a styrene-based resin, and a terpene-based resin.

The liquid plasticizer may be an oil or a liquid rubber.

A pneumatic tire according to the invention is produced using the above sealant composition.

According to the invention, it is possible to provide a sealant composition excellent in exothermic performance, rigidity, and sealing characteristics.

BRIEF DESCRIPTION OF THE DRAWINGS

FIG. 1 is a cross-sectional view of a pneumatic tire according to an embodiment of the invention.

DESCRIPTION OF EMBODIMENTS

Hereinafter, matters related to embodiments of the invention will be described in detail.

A sealant composition according to the present embodiment contains 95 parts by mass to 150 parts by mass of a hydrocarbon resin, 20 parts by mass to 60 parts by mass of a liquid plasticizer, and 0.1 parts by mass to 10 parts by mass of a cellulose nanofiber, with respect to 100 parts by mass of a solid rubber component containing a diene rubber.

The solid rubber component according to the present embodiment contains a diene rubber, and a content of the diene rubber is preferably 50 mass % or more, and more preferably 80 mass % or more. Here, in the present specification, the term "solid" means having no fluidity at 23° C.

Examples of the diene rubber include a natural rubber (NR), an isoprene rubber (IR), a butadiene rubber (BR), a styrene-butadiene rubber (SBR), a styrene-isoprene copolymer rubber, a butadiene-isoprene copolymer rubber, and a styrene-isoprene-butadiene copolymer rubber. In addition, the diene rubber as a copolymer may be an alternating copolymer, a block copolymer, or a random copolymer. These solid rubbers may be used alone or in a blend of two or more thereof. Among these, the natural rubber (NR), the isoprene rubber (IR), or the butadiene rubber (BR) is preferred, and a combination of the natural rubber (NR) or the isoprene rubber (IR) and the butadiene rubber (BR) is preferred.

The solid rubber component may contain a rubber component other than the diene rubber, and examples thereof include a butyl rubber.

The hydrocarbon resin used in the sealant composition according to the present embodiment is a polymer that essentially contains carbon and hydrogen as a base. For example, the hydrocarbon resin may contain an aliphatic monomer, an alicyclic monomer, an aromatic monomer, or a hydrogenated aromatic monomer as a base, or may contain an aliphatic monomer and/or an aromatic monomer as a base. The hydrocarbon resin may be a petroleum-based resin or a non-petroleum-based resin (natural or synthetic resin).

Preferred examples of the hydrocarbon resin include a petroleum-based resin, a styrene-based resin, and a terpene-based resin.

Examples of the petroleum-based resin include an aliphatic petroleum resin, an aromatic petroleum resin, and an aliphatic/aromatic copolymer-based petroleum resin. The aliphatic petroleum resin is a resin obtained by cationic polymerization of an unsaturated monomer such as isoprene or cyclopentadiene, which is a petroleum fraction having 4 to 5 carbon atoms (C5 fraction) (also referred to as a C5 petroleum resin), and may be hydrogenated. The aromatic petroleum resin is a resin obtained by cationic polymerization of a monomer such as vinyltoluene, alkylstyrene, or indene, which is a petroleum fraction having 8 to 10 carbon atoms (C9 fraction) (also referred to as a C9 petroleum resin), and may be hydrogenated. The aliphatic/aromatic copolymer-based petroleum resin is a resin obtained by copolymerization of the C5 fraction and the C9 fraction (also referred to as a C5/C9 petroleum resin), and may be hydrogenated.

Examples of the styrene-based resin include an α-methylstyrene homopolymer, a styrene-α-methylstyrene copolymer, a styrene-based monomer-aliphatic monomer copolymer, an α-methylstyrene-aliphatic monomer copolymer, and a styrene-based monomer-α-methylstyrene-aliphatic monomer copolymer.

Examples of the terpene-based resin include a polyterpene resin and a terpene-phenol resin.

A softening point of the hydrocarbon resin is not particularly limited, and is preferably 80° C. to 150° C., and more preferably 80° C. to 120° C. Here, in the present specification, the "softening point" is a value measured in accordance with JIS K2207 (ring and ball).

A weight average molecular weight of the hydrocarbon resin is not particularly limited, and is preferably 500 to 3000, and more preferably 500 to 2500. Here, in the present specification, the weight average molecular weight is a value obtained by measuring a weight average molecular weight in terms of polystyrene by measurement by gel permeation chromatography (GPC).

A content of the hydrocarbon resin is 95 parts by mass to 150 parts by mass, preferably 95 parts by mass to 125 parts by mass, and more preferably 95 parts by mass to 115 parts by mass, with respect to 100 parts by mass of the solid rubber component. When the content of the hydrocarbon resin is 95 parts by mass or more, excellent production efficiency (coating speed) is easily obtained. When the content of the hydrocarbon resin is 150 parts by mass or less, a sealant layer formed by coating with the sealant composition is less likely to crack.

Examples of the liquid plasticizer include an oil or a liquid rubber. Here, in the present specification, the term "liquid" means having fluidity at 23° C.

As the oil, various oils generally compounded in a rubber composition can be used. Examples of the oil include a mineral oil such as a paraffin oil, a naphthene oil, and an aromatic oil.

Examples of the liquid rubber include a liquid isoprene rubber, a liquid butadiene rubber, a liquid styrene-butadiene rubber, a liquid isoprene butadiene rubber, a liquid isoprene styrene rubber, a liquid isoprene butadiene styrene rubber, a liquid isobutylene, and a liquid ethylene propylene diene rubber (EPDM). These liquid rubbers may be modified by carboxylation, methacrylation, or the like. These liquid rubbers may be used alone or in a blend of two or more thereof.

A content of the liquid plasticizer is 20 parts by mass to 60 parts by mass, preferably 20 parts by mass to 50 parts by mass, and more preferably 30 parts by mass to 50 parts by mass, with respect to 100 parts by mass of the solid rubber component. When the content of the liquid plasticizer is 20 parts by mass or more, a sealant layer formed by coating with the sealant composition is less likely to crack. When the content of the liquid plasticizer is 60 parts by mass or less, the liquid plasticizer is less likely to migrate to a member adjacent to the sealant composition.

The cellulose nanofiber may have a nano-sized fiber diameter, and the fiber diameter is preferably 100 nm or less, more preferably 80 nm or less, and still more preferably 1 nm to 60 nm. In addition, a fiber length of the cellulose nanofiber is not particularly limited, and is preferably 100 μm or less, more preferably 10 μm or less, and still more preferably 100 nm to 10 μm. The cellulose nanofiber can be obtained by defibrating a cellulose fiber. A defibrating method is not particularly limited, and a known method may be used. The cellulose fiber to be defibrated is not particularly limited, and a cellulose fiber (pulp) prepared from various natural plant fibers such as wood, rice husk, straw, or bamboo can be used. Here, an average fiber diameter and an average fiber length are obtained by randomly extracting ten cellulose fibers from a scanning electron microscope (SEM) image, measuring short diameters and taking an arithmetic mean thereof as the average fiber diameter, and measuring longest diameters and taking an arithmetic mean thereof as the average fiber length.

A content of the cellulose nanofiber is 0.1 parts by mass to 10 parts by mass, preferably 0.5 parts by mass to 8 parts by mass, and more preferably 1 part by mass to 5 parts by mass, with respect to 100 parts by mass of the solid rubber component. When the cellulose nanofiber is contained in an amount of 0.1 parts by mass or more, the sealant composition has an appropriate viscosity, is fixed to the coated portion, and does not flow easily. When the content of the cellulose nanofiber is 10 parts by mass or less, excellent exothermic performance is likely to be obtained.

The sealant composition according to the present embodiment may contain a filler other than the cellulose nanofiber. A type of the filler is not particularly limited, and examples thereof include carbon black, bituminous coal, and silica.

A content of the filler (including the cellulose nanofiber) is not particularly limited, and is preferably 0.1 parts by mass to 30 parts by mass, and more preferably 1 part by mass to 20 parts by mass, with respect to 100 parts by mass of the solid rubber component.

As the carbon black and bituminous coal, various known kinds of products can be used.

As the silica, wet silica such as silica made by a wet-type precipitation method or silica made by a wet-type gel-method is preferably used. In addition to the silica, a silane coupling agent such as sulfide silane or mercapto silane may be further compounded. When a silane coupling agent is added, a compounding amount of the silane coupling agent is preferably 2 mass % to 20 mass % with respect to a compounding amount of the silica.

In the sealant composition according to the present embodiment, a crosslinking compounding ingredient may be compounded. When a crosslinking compounding ingredient is compounded, the sealant composition is crosslinked after an inner side of a tire is coated, so that the fluidity of the sealant composition is reduced, the sealant composition is easily fixed on a tire inner surface, and a uniform sealant layer is easily formed.

Examples of the crosslinking compounding ingredient include a vulcanization agent or a vulcanization accelerator. Examples of the vulcanization agent include sulfur components such as powdered sulfur, precipitated sulfur, colloidal sulfur, insoluble sulfur, and highly dispersible sulfur. A compounding amount of the crosslinking compounding ingredient is not particularly limited, and is preferably 0.1 parts by mass to 2 parts by mass, more preferably 0.1 parts by mass to 1 part by mass, and still more preferably 0.1 parts by mass to 0.5 parts by mass, with respect to 100 parts by mass of the solid rubber component.

Examples of the vulcanization accelerator include a sulfenamide-based vulcanization accelerator, a thiuram-based vulcanization accelerator, a thiazole-based vulcanization accelerator, a thiourea-based vulcanization accelerator, a guanidine-based vulcanization accelerator, and a dithiocarbamate-based vulcanization accelerator. Among these, the sulfenamide-based vulcanization accelerator, the thiazole-based vulcanization accelerator, and the guanidine-based vulcanization accelerator are preferred. In addition, two or more of these vulcanization accelerators may be used in combination. When two or more of vulcanization accelerators are used in combination, it is preferable to use the guanidine-based vulcanization accelerator and the sulfenamide-based vulcanization accelerator and/or the thiazole-based vulcanization accelerator in combination.

Examples of the sulfenamide-based vulcanization accelerator include N-cyclohexyl-2-benzothiazolylsulfenamide (abbreviation: CZ), N-tert-butyl-2-benzothiazolylsulfenamide (abbreviation: NS), N-oxidiethylene-2-benzothiazolylsulfenamide (abbreviation: OBS), and N,N-diisopropyl-2-benzothiazolesulfenamide (abbreviation: DZ).

Examples of the guanidine-based vulcanization accelerator include 1,3-diphenylguanidine (abbreviation: D) and di-o-tolylguanidine (abbreviation: DT).

Examples of the thiazole-based vulcanization accelerator include 2-mercaptobenzothiazole (abbreviation: MBT), dibenzothiazyl disulfide (also referred to as di-2-benzothiazolyl disulfide, abbreviation: MBTS), a salt of 2-mercaptobenzothiazole (such as a zinc salt (abbreviation: ZnMBT), a sodium salt (abbreviation: NaMBT), or a cyclohexylamine salt (abbreviation: CMBT)), and 2-(4'-morpholinodithio) benzothiazole (abbreviation: MBDS).

A content of the sulfenamide-based vulcanization accelerator is not particularly limited, and is preferably 0.1 parts by mass to 3 parts by mass, and more preferably 0.5 parts by mass to 2 parts by mass, with respect to 100 parts by mass of the solid rubber component.

A content of the guanidine-based vulcanization accelerator is not particularly limited, and is preferably 0.1 parts by mass to 3 parts by mass, and more preferably 0.5 parts by mass to 2 parts by mass, with respect to 100 parts by mass of the solid rubber component.

A content of the thiazole-based vulcanization accelerator is not particularly limited, and is preferably 0.1 parts by mass to 3 parts by mass, and more preferably 0.5 parts by mass to 2 parts by mass, with respect to 100 parts by mass of the solid rubber component.

A content of the vulcanization accelerator (when two or more vulcanization accelerators are compounded, refers to a total amount of the vulcanization accelerators) is preferably 0.1 parts by mass to 3 parts by mass, more preferably 1.0 part by mass to 2.5 parts by mass, and still more preferably 1.5 parts by mass to 2.0 parts by mass, with respect to 100 parts by mass of the solid rubber component. When the content of the vulcanization accelerator is 0.1 parts by mass or more, the sealant composition is easily fixed to the tire inner surface. When the content of the vulcanization accelerator is 3 parts by mass or less, excellent production efficiency (coating speed) is easily obtained.

As compounding ingredients other than the crosslinking compounding ingredient, compounding chemicals such as a process oil, a processing aid, zinc oxide, stearic acid, a softener, a plasticizer, a resin, a wax, and an antiaging agent, which are generally used in the rubber industry, can be appropriately compounded within a normal range.

The sealant composition according to the present embodiment can be produced using a kneader generally used in the rubber industry.

In a first step, compounding ingredients other than the hydrocarbon resin and the crosslinking compounding ingredient are added, and then are kneaded while increasing a temperature of a kneaded material. A discharge temperature at this time is not particularly limited, and is preferably 120° C. to 160° C.

Examples of the kneader used in the first step include a Banbury mixer, a roll mill, or a kneading extruder.

In a second step, the hydrocarbon resin and the crosslinking compounding ingredient are added to the kneaded material obtained in the first step and kneaded. A discharge temperature at that time is not particularly limited, and is preferably a temperature higher than the softening point of the hydrocarbon resin, more preferably a temperature of the softening point+10° C. or lower, and still more preferably a temperature of the softening point+5° C. or lower. A standard of the discharge temperature is, for example, preferably 80° C. to 120° C., and more preferably 90° C. to 110° C. By kneading at a temperature higher than the softening point of the hydrocarbon resin, excellent resin dispersibility is easily obtained.

Examples of the kneader used in the second step include a kneading extruder such as a twin-screw kneading extruder or a co-kneader.

A rubber composition obtained by the production method according to the present embodiment can be used for a tire, and can be applied as a sealant layer on an inner side of a pneumatic tire having various applications and sizes, such as for passenger vehicles, and for large-sized tires trucks and buses. The tire can be obtained by subjecting a prepared green tire (unvulcanized tire) to vulcanization molding in accordance with an ordinary method.

An embodiment of a tire having a sealant layer will be described with reference to FIG. 1. A tire 1 includes an annular tread 2 that comes into contact with a road surface, a pair of left and right beads 3 and 3 positioned at an inner side in a tire radial direction RD of the tread 2, and a pair of left and right sidewalls 4 and 4 positioned between the tread 2 and the beads 3 and 3. The tire 1 includes bead cores 5 embedded in the beads 3, a carcass ply 6 extending in a toroidal shape between the left and right beads 3 and 3, a belt 7 and a tread rubber 8 provided on an outer peripheral side of the carcass ply 6 in the tread 2, an inner liner 9 provided on a tire inner surface side of the carcass ply 6, and a sealant layer 10 provided on a tire inner surface side of the inner liner 9.

The sealant layer 10 is provided in a manner of overlapping an inner surface 1A of the tire 1, more specifically, an inner side of the inner liner 9. In this example, the sealant layer 10 is provided from an end portion or one side to an end portion on the other side in a tire axial direction AD on the tire inner surface 1A in the tread 2. In this way, the sealant layer 10 is preferably provided over the entire inner surface of the tread 2, or may be provided only on the inner surface of the tread 2, or may be provided in a wider range including the inner surface of the tread 2. That is, the sealant layer 10 is preferably provided on the inner surface 1A of the tire 1 including the inner surface of the tread 2.

A method for forming a sealant layer is not particularly limited, and for example, the sealant layer is formed by heating an obtained sealant composition to 80° C. to 160° C., coating an inner side of a tire with the sealant composition using a coating device, and then allowing the tire to stand at room temperature, thereby lowering fluidity of the sealant composition and fixing the sealant composition to the inner side of the tire.

A type of the pneumatic tire according to the present embodiment is not particularly limited, and examples thereof include various types of tires such as tires for passenger vehicles, and heavy-duty tires for trucks and buses.

EXAMPLES

Hereinafter, Examples of the invention will be illustrated, but the invention is not limited to these Examples.

Examples and Comparative Examples

According to compounding (part by mass) shown in Table 1 below, using a Banbury mixer, first, in a first step, components other than a hydrocarbon resin, sulfur, and a vulcanization accelerator were added and kneaded (discharge temperature=130° C.). In a second step, the hydrocarbon resin, the sulfur, and the vulcanization accelerator were added to and mixed with the obtained kneaded material (discharge temperature=90° C.) to prepare a rubber composition.

Details of each component in Table 1 are as follows.

IR: "IR2200" manufactured by JSR Corporation
BR: "UBEPOL BR150B" manufactured by UBE Corporation
Carbon black: "SEAST 7HM" manufactured by Tokai Carbon Co., Ltd.

and a strain of 25%. The rigidity was represented by an index, which is 100 in Comparative Example 1. A larger index indicates a higher viscosity at 40° C., and the sealant composition does not flow easily even being applied to a tire inner surface.

Exothermic performance: a loss factor tan δ at 60° C. was measured using a D-RPA3000 manufactured by Montech under conditions of a temperature of 60° C., a frequency of 10 Hz, and a strain of 1%. The rigidity was represented by an index, which is 100 in Comparative Example 1. A smaller index indicates better exothermic performance.

TABLE 1

|  | Example 1 | Example 2 | Example 3 | Example 4 | Example 5 | Example 6 | Example 7 | Example 8 | Comparative Example 1 |
|---|---|---|---|---|---|---|---|---|---|
| IR | 50 | 50 | 50 | 50 | 50 | 50 | 50 | 50 | 50 |
| BR | 50 | 50 | 50 | 50 | 50 | 50 | 50 | 50 | 50 |
| Carbon black | — | — | — | — | — | — | — | — | 20 |
| Cellulose nanofiber | 5 | 10 | 1 | 5 | 5 | 5 | 5 | 5 | 5 |
| Liquid plasticizer 1 | 35 | 35 | 35 | 35 | 35 | — | 35 | 35 | 35 |
| Liquid plasticizer 2 | — | — | — | — | — | 35 | — | — | — |
| Hydrocarbon resin 1 | 100 | 100 | 100 | — | — | 100 | 120 | 140 | 100 |
| Hydrocarbon resin 2 | — | — | — | 100 | — | — | — | — | — |
| Hydrocarbon resin 3 | — | — | — | — | 100 | — | — | — | — |
| Zinc oxide | 3 | 3 | 3 | 3 | 3 | 3 | 3 | 3 | 3 |
| Stearic acid | 3 | 3 | 3 | 3 | 3 | 3 | 3 | 3 | 3 |
| Sealing property after nail removal | No leakage | No leakage | No leakage | No leakage | No leakage | No leakage | No leakage | No leakage | No leakage |
| Rigidity | 112 | 142 | 102 | 131 | 142 | 135 | 123 | 135 | 100 |
| Exothermic performance | 93 | 97 | 87 | 94 | 96 | 94 | 98 | 99 | 100 |

Cellulose nanofiber: "BiNFi-s DRY POWDER" manufactured by SUGINO MACHINE LIMITED, fiber diameter 10 nm to 50 nm, fiber length=10 μm or less
Liquid plasticizer 1: oil, "Process NC140" manufactured by JXTG Energy Corporation
Liquid plasticizer 2: liquid polyisoprene rubber, "LIR 50" manufactured by Toray Industries, Inc.
Hydrocarbon resin 1: aliphatic/aromatic copolymer-based petroleum resin, "Petrotack 90" manufactured by TOSOH CORPORATION, softening point=95° C., weight average molecular weight=1600
Hydrocarbon resin 2: terpene-based resin, "SYLVATRAXX 4150" manufactured by KRATON Corporation, softening point×115° C., weight average molecular weight=2110
Hydrocarbon resin 3: α-methylstyrene-based resin, "SYLVATRAXX 4401" manufactured by KRATON Corporation, softening point=85° C., weight average molecular weight=1200
Zinc oxide: "Zinc oxide No. 2" manufactured by Mitsui Mining & Smelting Co., Ltd.
Stearic acid: "LUNAC S-20" manufactured by Kao Corporation A sealing property after nail removal, rigidity, and exothermic performance were evaluated for each of the obtained rubber compositions. Evaluation method is as follows.

Sealing property after nail removal: a pneumatic tire in which the obtained rubber composition was used a sealant layer was prepared and a nail was passed through the tread, and then the nail was pulled out. After the nail was pulled out, the sealing property was evaluated based on whether an air leakage occurred.

Rigidity: a loss factor tan δ at 40° C. was measured using a D-RPA3000 manufactured by Montech under conditions of a temperature of 40° C., a frequency of 1 Hz, Results are as shown in Table 1. In each Example, the sealing property after nail removal is excellent, and, compared with Comparative Example 1, the rigidity and the exothermic performance are also excellent.

REFERENCE SIGNS LIST

1: tire
2: tread
3: bead
4: sidewall
5: bead core
6: carcass ply
7: belt
8: tread rubber
9: inner liner
10: sealant layer
1A: tire inner surface
RD: tire radial direction
AD: tire axial direction

What is claimed is:

1. A sealant composition comprising:
   95 parts by mass to 150 parts by mass of a hydrocarbon resin, with respect to 100 parts by mass of a solid rubber component containing a diene rubber;
   20 parts by mass to 60 parts by mass of a liquid plasticizer, with respect to 100 parts by mass of the solid rubber component; and
   0.1 parts by mass to 10 parts by mass of a cellulose nanofiber, with respect to 100 parts by mass of the solid rubber component, wherein
   the liquid plasticizer is a mineral oil or a liquid rubber, and
   the liquid rubber is at least one selected from the group consisting of a liquid isoprene rubber, a liquid butadiene rubber, a liquid styrene-butadiene rubber, a liquid isoprene butadiene rubber, a liquid isoprene styrene rubber, a liquid isoprene butadiene styrene rubber, a liquid isobutylene, and a liquid ethylene propylene diene rubber.

2. The sealant composition according to claim 1, wherein the hydrocarbon resin is at least one selected from the group consisting of a petroleum-based resin, a styrene-based resin, and a terpene-based resin.

3. A pneumatic tire, which is produced using the sealant composition according to claim 1.

4. A pneumatic tire, which is produced using the sealant composition according to claim 2.

5. The sealant composition according to claim 1, wherein the liquid plasticizer is a mineral oil.

6. The sealant composition according to claim 1, wherein the liquid plasticizer is at least one liquid rubber selected from the group consisting of a liquid isoprene rubber, a liquid butadiene rubber, a liquid styrene-butadiene rubber, a liquid isoprene butadiene rubber, a liquid isoprene styrene rubber, a liquid isoprene butadiene styrene rubber, a liquid isobutylene, and a liquid ethylene propylene diene rubber.

7. The sealant composition according to claim 1, wherein the hydrocarbon resin is at least one selected from the group consisting of a petroleum-based resin, and a styrene-based resin.

8. The sealant composition according to claim 5, wherein the hydrocarbon resin is at least one selected from the group consisting of a petroleum-based resin, and a styrene-based resin.

9. The sealant composition according to claim 6, wherein the hydrocarbon resin is at least one selected from the group consisting of a petroleum-based resin, and a styrene-based resin.

10. A pneumatic tire, which is produced using the sealant composition according to claim 5.

11. A pneumatic tire, which is produced using the sealant composition according to claim 6.

12. A pneumatic tire, which is produced using the sealant composition according to claim 7.

13. A pneumatic tire, which is produced using the sealant composition according to claim 8.

14. A pneumatic tire, which is produced using the sealant composition according to claim 9.

* * * * *